United States Patent Office  3,787,408
Patented Jan. 22, 1974

3,787,408
CERTAIN PYRAZOLO[1,5-a]PYRIMIDO
[4,5-d]PYRIMIDINES
Akira Takamizawa, 73–6 Shimohozumi, Ibaraki, Japan, and Hisao Sato, 767 Tonda-cho, Takatsuki, Japan
No Drawing. Continuation-in-part of abandoned application Ser. No. 869,379, Oct. 24, 1969. This application Nov. 16, 1971, Ser. No. 199,367
Claims priority, application Japan, Oct. 28, 1968, 43/78,432, 43/78,433, 43/78,435
Int. Cl. C07d 51/12
U.S. Cl. 260—256.4 F    5 Claims

ABSTRACT OF THE DISCLOSURE

Pyrazolopyrimidopyrimidine derivatives of the formula:

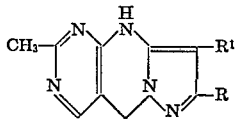

wherein R represents a hydrogen, lower alkyl, phenyl or phenyl(lower)alkyl and $R^1$ represents a hydrogen or phenyl, being useful as medicaments such as antipyretics, analgesics or anti-inflammatory agents, are prepared by four different routes.

---

This application is a continuation-in-part of our co-pending application Ser. No. 869,379 filed Oct. 24, 1969 and now abandoned.

The present invention relates to pyrazolopyrimidopyrimidine derivatives and production thereof. More particularly, it relates to pyrazolopyrimidopyrimidine derivatives, showing antipyretic, analgesic or anti-inflammatory activity.

The said pyrazolopyrimidopyrimidine derivatives are represented by the formula:

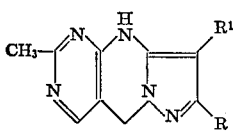

(I)

wherein R represents a hydrogen, lower alkyl (e.g. methyl, ethyl, isopropyl, n-butyl), phenyl or phenyl(lower)alkyl (e.g. benzyl, phenethyl, phenyl-n-propyl) and $R^1$ represents a hydrogen or phenyl.

A basic object of this invention is to provide pyrazolopyrimidopyrimidine derivatives (I). Another object of this invention is to provide pyrazolopyrimidopyrimidine derivatives (I) useful as antipyretics, analgesics and anti-inflammatory agents or as intermediates in the preparation of such medicaments. A further object of the invention is to provide a process for preparing pyrazolopyrimidopyrimidine derivatives (I) in four different routes.

The said pyrazolopyrimidopyrimidine derivatives (I) can be prepared by the following four routes.

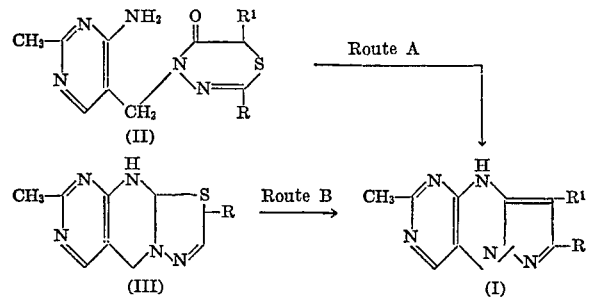

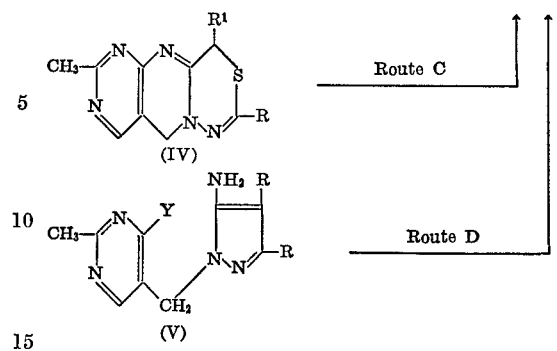

wherein R represents a hydrogen, lower alkyl, phenyl or phenyl(lower)alkyl, $R^1$ represents a hydrogen (only in Route D) or phenyl, and Y represents an amino group or hydroxy group.

ROUTE A

The starting Compounds II in this route may be prepared, for example, by condensing the known compounds, 4-amino-5-halogenomethyl-2-methylpyrimidines with the known compounds, the 1,3,4-thiadiazole derivatives [J. Goerdeler, J. Ohm and O. Tegtmeyer, Chem. Ber., 89, 1534 (1956); B. Föhlish, R. Braun and K. W. Schultze, Angew. Chem., 79, 318 (1967); Burger, "Medicinal Chemistry," 2nd edition, pp. 134–135 (1960)] to yield the corresponding 1,3,4-thiadiazolium salts, and then reacting the latter with diethyl benzoyl phosphonate. The reaction sequence is illustrated by the accompanying scheme.

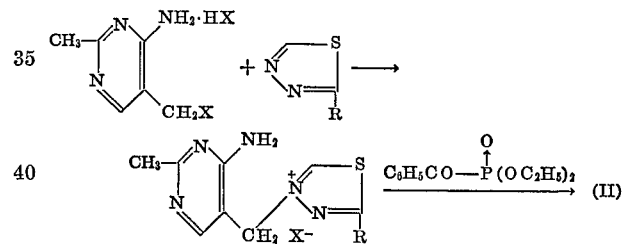

wherein R represents a hydrogen, lower alkyl, phenyl or phenyl(lower)alkyl, and X represents a halogen.

This route is effected by reacting the 1,3,4-thiadiazines (II) with phosphoryl halides at temperatures ranging from room temperature to reflux temperatures of the phosphoryl halide used. As phosphoryl halides, there are exemplified phosphoryl chloride and phosphoryl bromide. Since the phosphoryl halides also serve as solvent, it is not necessary to always use a solvent, but if required, a suitable inert solvent such as chloroform, carbon tetrachloride and the like may be used.

Representative of the starting 1,3,4-thiadiazines (II) are:

2,6 - diphenyl - 4 - (2 - methyl - 4 - aminopyrimidin - 5-ylmethyl)-5,6-dihydro-4H-1,3,4-thiadiazin-5-one,
4 - (2 - methyl - 4 - aminopyrimidin - 5 - ylmethyl) - 6-phenyl-5,6-dihydro-4H-1,3,4-thiadiazin-5-one,
2 - isopropyl - 4 - (2 - methyl - 4 - aminopyrimidin - 5-ylmethyl)-5,6-dihydro-4H-1,3,4-thiadiazin-5-one,
2 - benzyl - 4 - (2 - methyl - 4 - aminopyrimindin - 5-ylmethyl) - 6 - phenyl - 5,6 - dihydro - 4H - 1,3,4 - thiadiazin-5-one, and
2 - phenyl - 4 - (2 - methyl - 4 - aminopyrimidin - 5 - ylmethyl)-5,6-dihydro-4H-1,3,4-thiadiazin-5-one.

ROUTE B

The starting Compound III in this route may be prepared, for example, by treating the aforementioned 1,3,4- thiadiazolium salts with a base, as illustrated in the equation below.

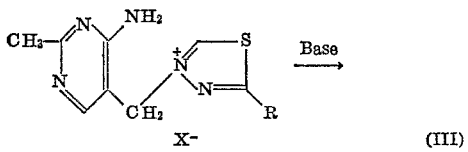

wherein R represents a hydrogen, lower alkyl, phenyl or phenyl(lower)alkyl, and X represents a halogen.

This route is effected by reacting the starting Compounds III with a phosphorus compound of the formula:

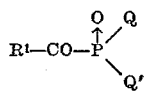

wherein $R^1$ represents a phenyl, Q represents a lower alkoxy, and Q' represents a lower alkoxy or phenyl, in the presence of a base in an inert solvent. Examples of the phosphorus compounds are di(lower) alkyl benzoyl phosphonates (e.g. diethyl benzoyl phosphonate, dimethyl benzoyl phosphonate) and lower alkyl phenyl benzoyl phosphinates (e.g. methyl phenyl benzoyl phosphinate, ethyl phenyl benzoyl phosphinate). The base involves dimethylamine, diethylamine, triethylamine, trimethylamine, diethylamine, pyridine and the like. The said solvent involves benzene, toluene, ether, dioxane, tetrahydrofuran, acetone, chloroform, carbon tetrachloride, ethyl acetate, dimethylformamide and the like. The reaction may be conducted at room temperature or under heating up to the reflux temperatures of the solvent used.

Representative of the starting Compound III are:

2,8 - dimethyl - 10,10a - dihydro - 5H - pyrimido[4,5 - d] 1,3,4-thiadiazolo[3,2-a]pyrimidine, 2 - phenyl - 8 - methyl - 10,10a - dihydro - 5H - pyrimido [4,5-d]-1,3,4-thiadiazolo[3,2-a]pyrimidine, 2 - phenethyl - 8-methyl - 10,10a - dihydro - 5H - pyrimido [4,5-d]-1,3,4-thiadiazolo 3,2-a]pyrimidine, and 8 - methyl - 10,10a - dihydro - 5H - pyrimido[4,5 - d]- 1,3,4-thiadiazolo[3,2-a]pyrimidine.

ROUTE C

The starting Compound IV in this route may be prepared, for example, by reacting the aforementioned 1,3,4-thiadiazolium salts with diethyl benzoyl phosphonate and then treating the resulting intermediates with a base as illustrated in the equation below.

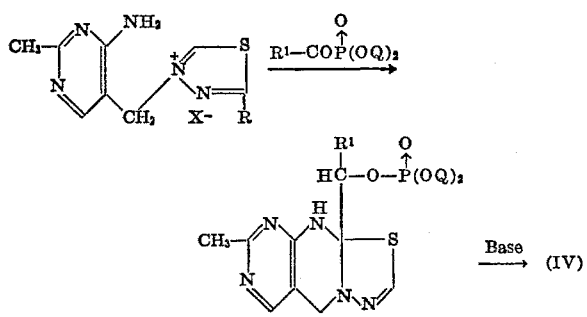

wherein R represents a hydrogen, lower alkyl, phenyl or phenyl(lower)alkyl, $R^1$ represents a phenyl, Q represents a lower alkyl, and X represents a halogen.

This route is carried out by heating the starting pyrimidopyrimidothiazines (IV) at temperatures ranging from room temperature to 250° C. without solvent or in an inert solvent.

Representative of the starting Compounds IV are:

2,4 - diphenyl - 7 - methyl - 4,10 - dihydropyrimido[4',5'- 4,5]pyrimido[1,2-d]-1,3,4-thiadiazine.

4 - phenyl - 7 - methyl - 4,10 - dihydropyrimido[4',5' - 4,5] pyrimido[1,2-d]-1,3,4-thiadiazine, 2,7 - dimethyl - 4 - phenyl - 4,10 - dihydropyrimido[4',5'- 4,5]pyrimido[1,2-d]-1,3,4-thiadiazine, and 2 - benzyl - 4 - phenyl - 7 - methyl - 4,10 - dihydropyrimido[4',5'-4,5]pyrimido[1,2-d]-1,3,4-thiadiazine.

ROUTE D

The staring Compounds V in this route may be prepared, for example, by reacting the aforementioned 4-amino-5-halogenomethyl-2-methylpyrimidines with 5-acetamidopyrazoles, hydrolyzing the resulting products with an alkali and treating the resulting 2-methyl-4-amino-5-(5-aminopyrazol-1-ylmethyl)pyrimidines (Va) with an acid to give 2-methyl-4-hydroxy-5-(5-aminopyrazol-1-ylmethyl)pyrimidines (Vb). The said 5-acetamidopyrazoles may be prepared by reacting α-substituted or unsubstituted acetonitriles with carboxylic esters in the presence of a base to give α-acylacetonitriles, reacting the latter with hydrazine to give 5-aminopyrazoles, and then acetylating the latter with acetic anhydride. The reaction sequence is illustrated by the accompanying equation.

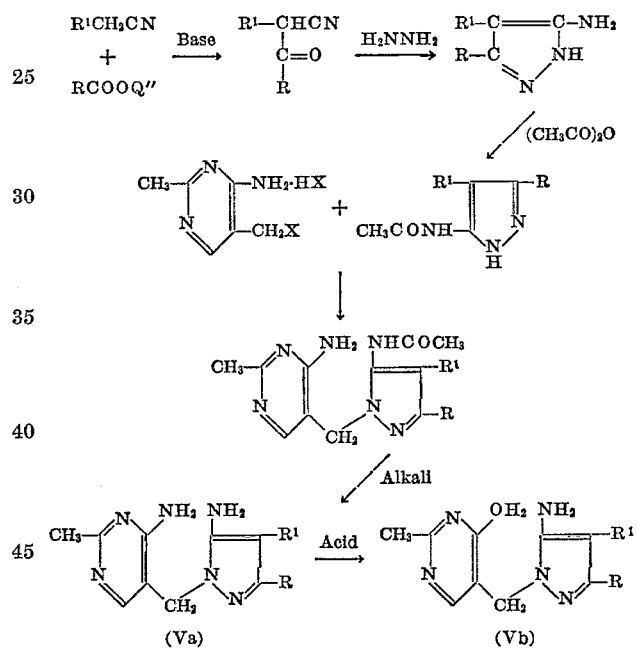

wherein R represents a hydrogen, lower alkyl, phenyl or phenyl(lower)alkyl, $R^1$ represents a hydrogen or phenyl, X represents a halogen, and Q'' represents a lower alkyl.

This route is carried out by reacting the aforementioned pyrimidine derivatives (V) with a condensing agent at temperatures ranging from room temperature to reflux temperatures of the inert solvent used. Examples of the condensing agents are sulfuric acid, phosphoric acid, hydrochloric acid, polyphosphoric acid, acetic anhydride and phthalic anhydride, and examples of the inert solvents are water, lower alkanols, dioxane, tetrahydrofuran, dimethylformamide and ether.

Representative of the starting Compound V are:

2-methyl-4-amino-5-(4-phenyl-5-aminopyrazol-1-ylmethyl)pyrimidine, 2-methyl-4-amino-5-(3,4-diphenyl-5-aminopyrazol-1-ylmethyl)pyrimidine, 2-methyl-4-hydroxy-5-(3,4-diphenyl-5-aminopyrazol-1-ylmethyl)pyrimidine, 2-methyl-4-amino-5-(3-methyl-5-aminopyrazol-1 ylmethyl)pyrimidine, 2-methyl-4-hydroxy-5-(3-phenethyl-5-aminopyrazol-1-ylmethyl)pyrimidine, and 2-methyl-4-amino-5-(4-phenyl-5-aminopyrazol-1 ylmethyl)pyrimidine.

Specific examples of the pyrazolopyrimidopyrimidine derivatives (I) prepared in the invention are:

2-methyl-8,9-diphenyl-5,10-dihydropyrazolo[1,5-a]pyrimido[4,5-d]pyrimidine,
2-methyl-9-phenyl-5,10-dihydropyrazolo[1,5-a]pyrimido[4,5-d]pyrimidine,
2,3-dimethyl-5,10-dihydropyrazolo[1,5-a]pyrimido[4,5-d]pyrimidine,
2-methyl-8-phenyl-5,10-dihydropyrazolo[1,5-a]pyrimido[4,5-d]pyrimidine, and
2-methyl-8-benzyl-5,10-dihydropyrazolo[1,5-a]pyrimido[4,5-d]pyrimidine.

The thus resulting pyrazolopyrimidopyrimidine derivatives (I) are useful as antipyretic agents, analgesic agents or anti-inflammatory agents. For example, 2-methyl-9-phenyl - 5,10 - dihydropyrazolo[1,5-a]pyrimido[4,5-d]pyrimidine (100 mg.) shows 21.4% inhibition against the edema caused by carragheenin in the Wistar rat when orally administered to the animal. $LD_{50}$ of this compound is over 800 mg./kg. in mice administered subcutaneously. The other compounds prepared in this invention also have the said activities. They can be applied in a variety of per se conventional ways, e.g. in the form of tablets, solution, suspension, emulsion, granules or suppositories, in mixture with suitable carriers to human patients suffering from chronic articular rheumatism, gout, periarthritis, rheumatic fever or neuralgi. In the treatment of a human adult for the alleviation of rheumatism from which he suffers, the oral administration in one or more dosage form of 50 to 450 mg./kg. of 2-methyl-9-phenyl-5,10 - dihydropyrazolo[1,5-a]pyrimido[4,5-d]pyrimidine per day is indicated.

The invention will be better explained by the following examples which are not intended as a limitation thereof.

Example 1

A mixture of 2,6-diphenyl-4-(2-methyl-4-aminopyrimidin-5-ylmethyl) - 5,6 - dihydro-4H-1,3,4-thiadiazin-5-one (M.P. 205–208° C.) (649 mg.) and phosphoryl chloride (13.7 g.) is heated at 110° C. on an oil bath for 8 hours under nitrogen stream. The reaction mixture is allowed to stand at room temperature overnight, and an excess of phosphoryl chloride is evaporated under reduced pressure. The residue is mixed with ice-piece and chloroform and neutralized with sodium bicarbonate. The chloroform layer is washed with water, dried over anhydrous sodium sulfate and evaporated to dryness. The crystalline residue is chromatographed on silica gel and the crystals eluated with acetone are recrystallized from chloroform-ethanol to give 2-methyl-8,9-diphenyl - 5,9 - dihydropyrazolo[1,5-a]pyrimido[4,5-d]pyrimidine (349 g.) as crystals melting at 263–265° C. (decomp.). Yield: 61.8%.

Example 2

In the same manner as Example 1, 4-(2-methyl-4-aminopyrimidin-5-ylmethyl) - 6 - phenyl - 5,6 - dihydro-4H-1,3,4-thiadiazin-5-one (M.P. 147–149° C.) is treated with phosphoryl chloride to give 2-methyl-9-phenyl-5,10-dihydropyrazolo[1,5-a]pyrimido[4,5-d]pyrimidine as crystals melting at 230–234° C. (recrystallized from ethanol). Yield: 65%.

Example 3

A mixture of 2-phenyl-8-methyl-10,10a-dihydro-5H-pyrimido[4,5-d]1,3,4 - thiadiazolo[3,2-a]pyrimidine (544 mg.), diethyl benzoyl phosphonate (486 mg.), pyridine (1.6 g.) and anhydrous dimethylformamide (16 ml.) is heated at 105° C. on an oil bath for 18 hours. Dimethylformamide is evaporated at temperature below 50° C. under reduced pressure and the residue is extracted with chloroform. The chloroform layer is washed with water, sodium bicarbonate aqueous solution and water successively, dried over anhydrous sodium sulfate and evaporated to dryness. The residue is crystallized from ether, and the precipitated crystals are collected by filtration and recrystallized from chloroform to give 3-(2-methyl-4-aminopyrimidin-5-ylmethyl) - 5 - phenyl-1,3,4-thiadiazol-2(3H)-thione (120 mg.) as colorless columnar crystals melting at 258–259° C.

The ethereal mother liquid is allowed to stand at room temperature and the precipitated crystals are collected by filtration and recrystallized from ethanol/chloroform to give 2-methyl-8,9-diphenyl-5,10-dihydropyrazolo[1,5-a]pyrimido[4,5-d]pyrimidine (122 mg.) as colorless plates melting at 264–266° C.

Example 4

2,4 - diphenyl - 7 - methyl-4,10-dihydropyrimido[4',5'-4,5]pyrimido[1,2-d]-1,3,4-thiadiazine (M.P. 125–127° C.) (400 mg.) is heated at 140 to 150° C. for 15 minutes, and the resulting product is recrystallized from ethanol to give 2-methyl - 8,9 - diphenyl-5,10-dihydropyrazolo[1,5-a]pyrimido[4,5-d]pyrimidine (320 mg.) as colorless plates melting at 264–266° C.

Example 5

A mixture of 2,4-diphenyl-7-methyl-4,10-dihydropyrimido[4',5'-4,5]pyrimido[1,2-d] - 1,3,4 - thiadiazine (144 mg.), 99% ethanol (10 g.) and water (6 g.) is heated under reflux for 40 minutes. The reaction mixture is evaporated to dryness and the residue is extracted with chloroform. The chloroform layer is washed with water, dried over anhydrous sodium sulfate and evaporated to dryness. The residue is crystallized from acetone/ether to give 2-methyl - 8,9 - diphenyl-5,10-dihydropyrazolo[1,5-a]pyrimido[4,5-d]pyrimidine (116 mg.) as crystals melting at 264–266° C. (recrystallized from ethanol).

Example 6

4-phenyl - 7 - methyl-4,10-dihydropyrimido[4',5'-4,5]pyrimido[1,2-d]-1,3,4-thiadiazine (M.P. 129–132° C.) (500 mg.) is heated at 140° C. for 20 minutes, and the reaction product is recrystallized from ethanol to give 2-methyl - 9 - phenyl-5,10-dihydropyrazolo[1,5-a]pyrimido-[4,5-d]pyrimidine (390 mg.) as colorless plates melting at 230–234° C.

Example 7

A mixture of 2-methyl-4-amino-5-(4-phenyl-5-aminopyrazol-1-ylmethyl)pyrimidine (M.P. 208–210° C.) (300 mg.) and 20% hydrochloric acid (10 ml.) is heated for 3 hours. The reaction mixture is evaporated under reduced pressure and the residue is neutralized with sodium bicarbonate aqueous solution. The precipitated gelatinous material is washed with water, dried and extracted with chloroform while heating. The insoluble material is collected by filtration and recrystallized from ethanol to give 2-methyl - 4 - hydroxy-5-(4-phenyl-5-aminopyrazol-1-ylmethyl)pyrimidine (50 mg.) as colorless needles melting at 249–251° C. Yield: 16.6%.

The chloroform extract is purified by chromatography on alumina. The chloroform elution affords 2-methyl-9-phenyl - 5,10 - dihydropyrazolo[1,5-a]pyrimido[4,5-d]pyrimidine (59 mg.) in 20.9% yield. The product is recrystallized from ethanol to give colorless plates melting at 230–234° C.

Example 8

A mixture of 2-methyl-4-hydroxy-5-(4-phenyl-5-aminopyrazol-1-ylmethyl)pyrimidine (200 mg.) and 20% hydrochloric acid (10 ml.) is refluxed for 2 hours. After cooling, the reaction mixture is neutralized with sodium bicarbonate aqueous solution and kept in a freezer for two days. The precipitated crystals (the starting material) are filtered off. The filtrate is extracted with chloroform, and the chloroform layer is washed with water, dried over anhydrous sodium sulfate and evaporated to dryness. The crystalline residue is recrystallized from acetone to give light yellow crystals (48 mg.) melting at 210–220° C. in 25.6% yield. IR-spectrum and TLC analysis indicates that this compound is 2-methyl-9-phenyl-5,10-dihydropyrazolo-

[1,5-a]pyrimido[4,5-a]pyrimidine contaminated with a small amount of the starting material.

Example 9

In the same manner as Example 8, 2-methyl-4-hydroxy-5-(3,4-diphenyl-5-aminopyrazol-1-ylmethyl)pyrimidine is converted into 2-methyl-8,9-diphenyl-5,10-dihydropyrazo-[1,5-a]pyrimido[4,5-d]pyrimidine as colorless plates melting at 263–265° C. (decomp.) (crystallized from chloroform/ethanol). Yield: 20%.

Example 10

A solution of 2-methyl-4-amino-5-(3-methyl-5-aminopyrazol-1-ylmethyl)pyrimidine (M.P. 182.5–183° C.) (75 mg.) in 20% hydrochloric acid (3.5 ml.) is refluxed for 3 hours. After cooling, the reaction mixture is neutralized with sodium bicarbonate aqueous solution. The precipitated crystals are collected by filtration, washed with water, dried and recrystallized from methanol to give 2,8 - dimethyl - 5,10 - dihydropyrazolo[1,5-a]pyrimido-[4,5-d]pyrimidine (9 mg.) as colorless plates melting at 267–268° C. Yield: 14%.

Example 11

To a suspension of 2-methyl-4-amino-5-(3-phenyl-5-acetylaminopyrazol-1-ylmethyl)pyrimidine (1 g.) in ethanol (100 ml.) is added 10% sodium hydroxide aqueous solution (20 ml.), and the mixture is heated in a sealed tube at 110° C. for 8.5 hours. The reaction mixture is evaporated under reduced pressure, and then water is added. The resultant aqueous mixture is acidified with 15% hydrochloric acid and filtered to remove impurities. The filtrate is neutralized with sodium bicarbonate, and the precipitated crystals are collected by filtration and washed with water. The resultant 2-methyl-4-amino-5-(3-phenyl - 5 - aminopyrazol-1-ylmethyl)pyrimidine (M.P. 154–156° C., crystallized from acetone) is dissolved in 20% hydrochloric acid (80 ml.), and the solution is refluxed for 3 hours. After cooling, the reaction mixture is neutralized with sodium bicarbonate, and the precipitate is collected by filtration, washed with water, dried, chromatographed on alumina, and eluated with ethyl acetate. The first fraction affords 2-methyl-8-phenyl-5,10-dihydropyrazolo[1,5-a]pyrimido[4,5-d]pyrimidine (500 mg.) as colorless columnar crystals melting at above 290° C. (crystallized from methanol). Yield: 61.4%.

What is claimed is:

1. A member selected from the group consisting of pyrazolopyrimidine derivatives represented by the formula:

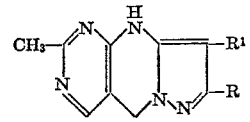

wherein R represents a member selected from the group consisting of hydrogen, alkyl of 1 to 4 carbon atoms, phenyl and phenylalkyl wherein the alkyl has 1 to 3 carbon atoms, and $R^1$ is hydrogen or phenyl.

2. A compound according to claim 1, in which R is hydrogen and $R^1$ is phenyl.

3. A compound according to claim 1, in which R is phenyl and $R^1$ is phenyl.

4. A compound according to claim 1, in which R is methyl and $R^1$ is hydrogen.

5. A compound according to claim 1, in which R is phenyl and $R^1$ is hydrogen.

References Cited

UNITED STATES PATENTS 3,600,390    8/1971    Sherlock     260—256.4 F

RICHARD J. GALLAGHER, Primary Examiner

U.S. Cl. X.R.

260—243 R, 256.4 N, 256.4 C, 256.5 R, 310 R, 465 R, 465.1; 404—251